(12) United States Patent
Alvarez et al.

(10) Patent No.: US 10,866,342 B2
(45) Date of Patent: *Dec. 15, 2020

(54) RADAR BASED PRECIPITATION ESTIMATES USING SPATIOTEMPORAL INTERPOLATION

(71) Applicant: The Climate Corporation, San Francisco, CA (US)

(72) Inventors: Francisco Alvarez, Seattle, WA (US); Valliappa Lakshmanan, Bellevue, WA (US)

(73) Assignee: THE CLIMATE CORPORATION, San Francisco, CA (US)

(*) Notice: Subject to any disclaimer, the term of this patent is extended or adjusted under 35 U.S.C. 154(b) by 184 days.

This patent is subject to a terminal disclaimer.

(21) Appl. No.: 16/168,590

(22) Filed: Oct. 23, 2018

(65) Prior Publication Data
US 2019/0129065 A1 May 2, 2019

Related U.S. Application Data

(63) Continuation of application No. 15/160,790, filed on May 20, 2016, now Pat. No. 10,107,939.

(51) Int. Cl.
*G01W 1/10* (2006.01)
*G01S 13/95* (2006.01)
(Continued)

(52) U.S. Cl.
CPC ............... *G01W 1/10* (2013.01); *G01S 7/003* (2013.01); *G01S 13/87* (2013.01); *G01S 13/95* (2013.01);
(Continued)

(58) Field of Classification Search
CPC ....... G01W 1/10; G06Q 10/063; G06Q 50/02; G01S 7/003; G01S 13/87; G01S 13/951; G01S 13/95; Y02A 90/18; A01B 79/005
(Continued)

(56) References Cited

U.S. PATENT DOCUMENTS 8,594,936 B1  11/2013  Koval
9,519,057 B1  12/2016  Eilts
(Continued)

OTHER PUBLICATIONS

Alvarez, U.S. Appl. No. 15/160,790, filed May 20, 2016, Notice of Allowance, dated Jun. 27, 2018.
(Continued)

*Primary Examiner* — Frank J McGue
(74) *Attorney, Agent, or Firm* — Hickman Palermo Becker Bingham LLP

(57) ABSTRACT

A system and method for improving radar based precipitation estimates using spatiotemporal interpolation is provided. In an embodiment, an agricultural intelligence computer system receives a plurality of radar based precipitation rate values representing precipitation rate measurements at a plurality of locations and a plurality of times. The agricultural intelligence computer system identifies a first non-zero radar based precipitation rate value associated with a first location of the plurality of locations and a first time of the plurality of times. The agricultural intelligence computer also identifies a second non-zero radar based precipitation rate value associated with a second location of the plurality of locations and a second time of the plurality of times. The agricultural intelligence computer system determines that the first non-zero radar based precipitation rate value corresponds to the second non-zero radar based precipitation rate value. Based on the first non-zero radar based precipitation rate value and the second non-zero radar based precipitation rate value, the agricultural intelligence computer system computes a non-zero precipitation accumulation value at a third location and a third time.

22 Claims, 8 Drawing Sheets

(51) Int. Cl.
  *G01S 7/00* (2006.01)
  *G01S 13/87* (2006.01)
  *G06Q 50/02* (2012.01)
  *G06Q 10/06* (2012.01)
  *A01B 79/00* (2006.01)

(52) U.S. Cl.
  CPC .......... *G01S 13/951* (2013.01); *G06Q 10/063* (2013.01); *G06Q 50/02* (2013.01); *A01B 79/005* (2013.01); *Y02A 90/10* (2018.01)

(58) Field of Classification Search
  USPC ...................................................... 342/26 R
  See application file for complete search history.

(56) References Cited

U.S. PATENT DOCUMENTS

| | | | |
|---|---|---|---|
| 10,107,939 B2 * | 10/2018 | Alvarez | ............... G06Q 10/063 |
| 2017/0336533 A1 | 11/2017 | Alvarez | |

OTHER PUBLICATIONS

H. Van De Vyver, "Apatial Regression Modules for Extreme Precipitation in Belgium", Onlinelibrary.wiley.com/doi/10.1029/2011WR011707/full, dated Sep. 26, 2012.

* cited by examiner

Fig. 2
(a)
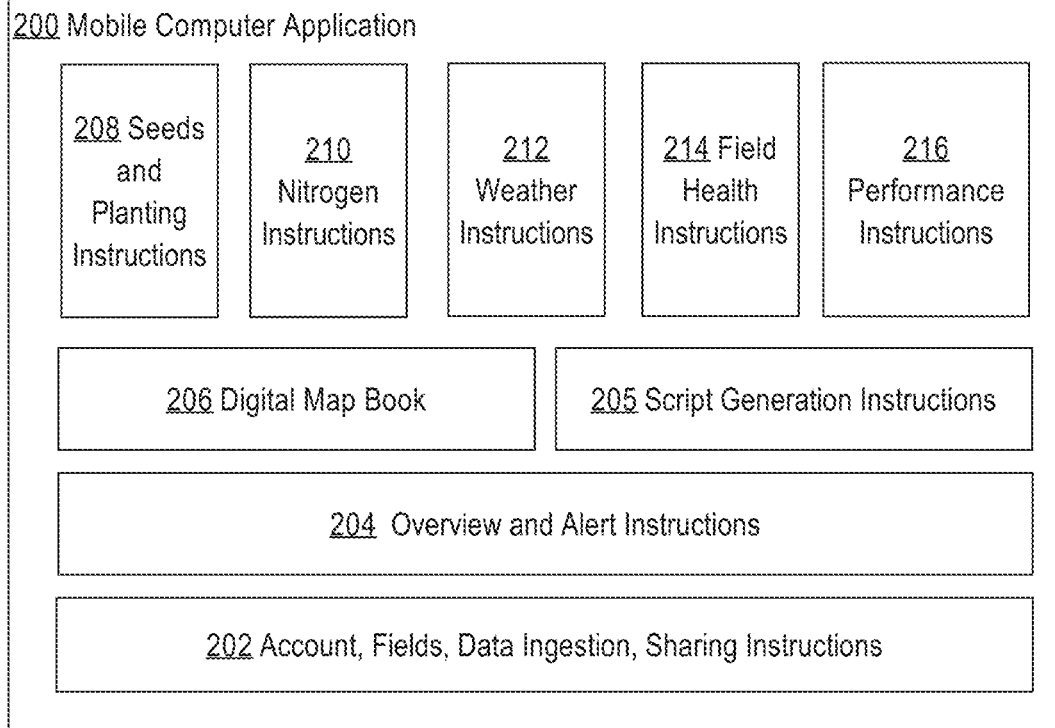
(b)
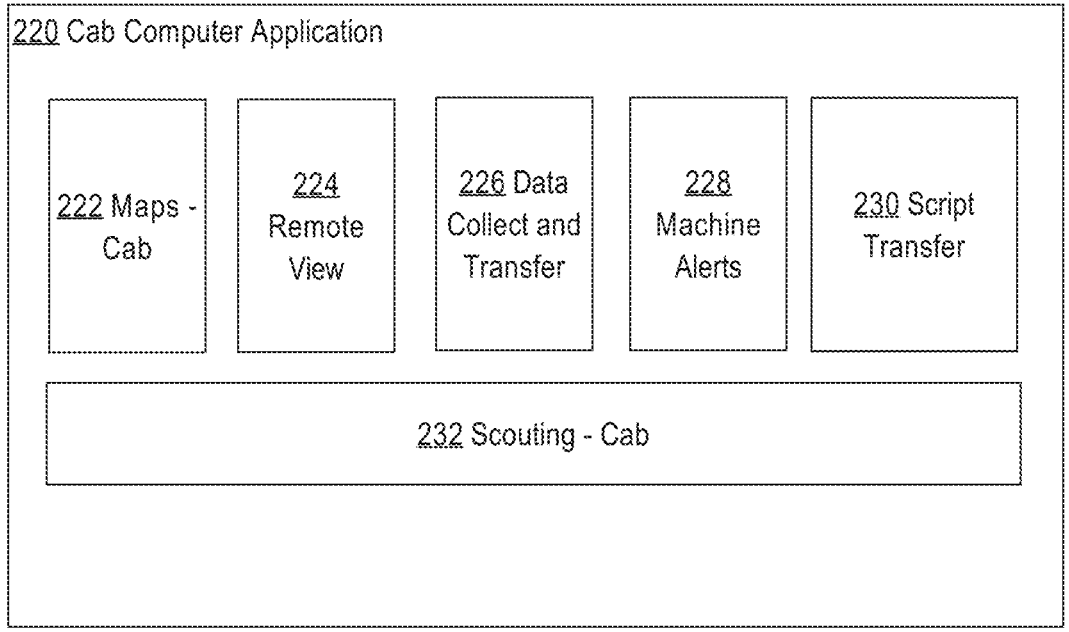

Data Manager

| | | Nitrogen | Planting | Practices | Soil | |
|---|---|---|---|---|---|---|

Planting 1 (4 Fields)
Crop: Corn Product
Plant Date: 2016-04-12
ILU 112 | Pop: 34000
[Edit] [Apply]

Planting 2 (0 Fields)
Crop: Corn Product
Plant Date: 2016-04-15
ILU 83 | Pop: 34000
[Edit] [Apply]

Planting 3 (0 Fields)
Crop: Corn Product
Plant Date: 2016-04-13
ILU 83 | Pop: 34000
[Edit] [Apply]

Planting 4 (1 Fields)
Crop: Corn Product
Plant Date: 2016-04-13
ILU 112 | Pop: 34000
[Edit] [Apply]

[+] Add New Planting Plan

| | | CROP | PLANTED ACRES | PRODUCT | RELATIVE MATURITY | TARGET YIELD | POPULATION (AVG) | PLA |
|---|---|---|---|---|---|---|---|---|
| ☐ | Select All | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | DMC82-M | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

FIG. 6

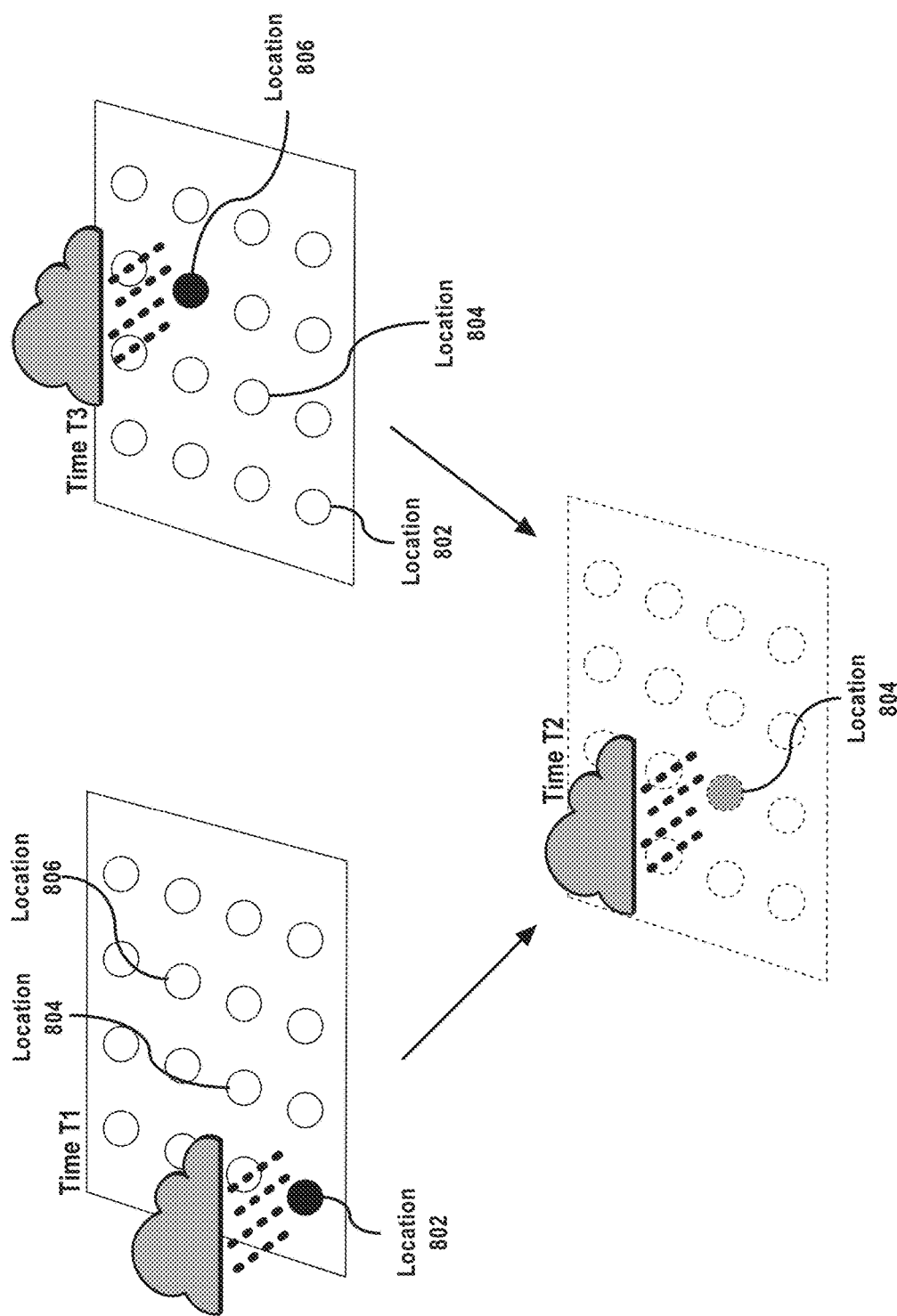

RADAR BASED PRECIPITATION ESTIMATES USING SPATIOTEMPORAL INTERPOLATION

BENEFIT CLAIM

This application claims the benefit under 35 U.S.C. § 120 as a Continuation of application Ser. No. 15/160,790, filed May 20, 2016, the entire contents of which is hereby incorporated by reference as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2018 The Climate Corporation.

FIELD OF THE DISCLOSURE

The present disclosure relates to computer systems useful in climatology and agricultural. The disclosure relates more specifically to computer systems that are programmed or configured to generate precipitation estimates through spatiotemporal interpolation of radar based precipitation estimate values.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Water, often received via rain or other precipitation, is an essential element to life. For farmers, rainfall is a large factor in determining how much water a crop receives, thereby altering the potential yield for the crop. While rainfall has many positive effects, such as giving life to crops, large quantities of rainfall can also have severe repercussions, such as by causing floods or resulting in standing or ponding water that can inundate seedlings or mature crops. Thus, accurate measurements of rainfall can be extremely important, both to maximize gains from the rainfall and minimize risks from an overabundance of rainfall.

A common approach for measuring rainfall involves utilizing radar data to calculate the rainfall. Generally, a polarized beam of energy is emitted from a radar device in a particular direction. The beam travels un-disturbed before encountering a volume of air containing hydrometeors, such as rainfall, snowfall, or hail, which causes the beam to scatter energy back to a radar receiver. Based on the amount of time it takes for a radar beam to return, the distance between the radar device and the volume of air containing hydrometeors is computed. The amount of energy that is received by the radar, also known as the reflectivity, is used to compute the rainfall rate. Often, the relationship between the reflectivity and the actual rainfall rate is modeled through the Z-R transformation:

$$Z=aR^b$$

where Z is the reflectivity and R is the actual rainfall rate. The parameters for the Z-R transformation may be identified through measurements for rain gauges for a particular area and type of storm.

A drawback with using radar reflectivity to measure the rainfall rate is that radar systems are unable to take continuous measurements of reflectivity values. Instead, radar systems produce reflectivity data at discrete instances which are separated by an interval of time that is dependent on the speed at which the radar device can take successive measurements. Precipitation rate estimates are thus constrained by the speed of the radar device. For example, the fastest a radar can fully and reliably sample the surrounding environment is approximately four and a half minutes. While the radar may be able to send signals faster, the radar would not be able to distinguish signals received from a first sampling from radar signals received from a second sampling at a lower interval. For slow moving storms with low changes in intensity of precipitation, radar based precipitation estimates are adequate to produce hourly or daily accumulation at all locations.

The constraint of the radar devices creates difficulty in estimating precipitation for storms that rapidly increase or decrease in intensity. Additionally, the constraint of the radar devices creates difficulty in estimating precipitation for fast moving storms. For example, small convective storms can move extremely quickly over a region. Fast moving convective storms, such as supercells, can travel at up to seventy miles an hour. Between two successive measurements by the radar device, a storm may pass undetected over a region of land. While the radar device would process reflectivity data at the starting location and ending location of the storm, no radar reflectivity data would be available for the areas that the storm passed over in between measurements. Thus, even though it rained in a particular location in between the measurements, no precipitation rate estimate would be available for the particular location.

Often, it is important for a farmer to understand whether or not it rained at a particular field. With hundreds of acres of farmland to cover, a farmer may not be able to observer each portion of the field to determine where the farmland is wet and where the farmland is dry. Additionally, when too much water accumulates on a field, the field becomes unworkable. Thus, it becomes important to track supercells of a storm which may comprise higher rates of precipitation. If precipitation rate estimates are incomplete because they do not include estimates in locations where it rained or the estimates are low due to the movement of supercells of a storm, a farmer relying on the information may make decisions that adversely affect the crops on the field, such as determining whether to work on the field on a given day.

Thus, there is a need for a system which generates precipitation estimates for locations and times where radar based precipitation estimates are unavailable.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 8 depicts an example of interpolation precipitation rate estimates to a third location and time based on precipitation rate estimates at a first and second location and time.

DETAILED DESCRIPTION

Figure 1:
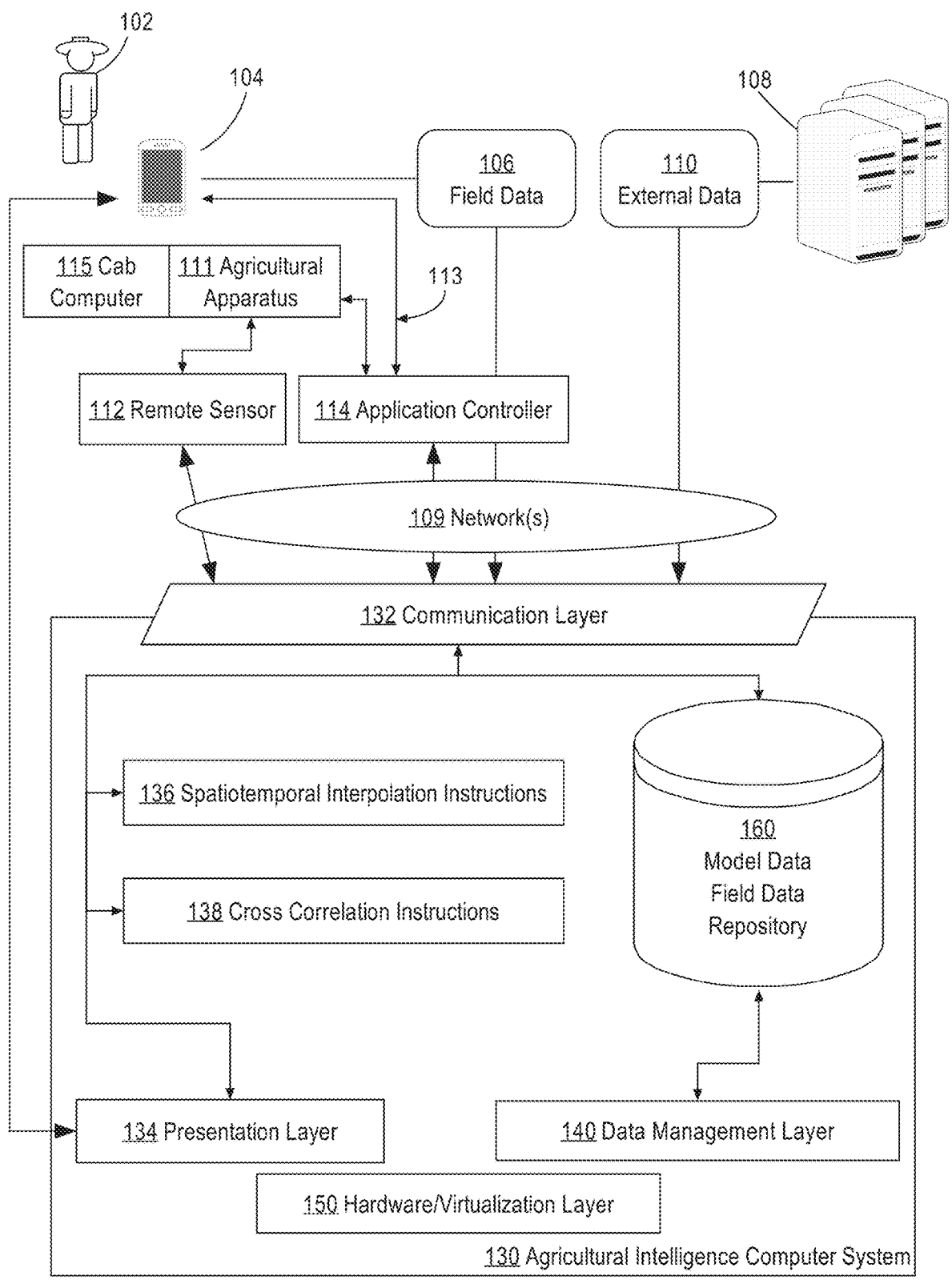
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. PRECIPITATION INTERPOLATION
   3.1. RADAR BASED PRECIPITATION ESTIMATES
   3.2. INTERPOLATING INTENSITY
   3.3. INTERPOLATING ACROSS SPACE AND TIME
      3.3.1. PHASE CORRELATION
      3.3.2. CELL TRACKING
4. PRECIPITATION DATA
5. AGRONOMIC MODELS
6. BENEFITS OF CERTAIN EMBODIMENTS
7. EXTENSIONS AND ALTERNATIVES 1. General Overview Aspects of the disclosure generally relate to computer-implemented techniques for improving radar based precipitation estimates using spatiotemporal interpolation. In an embodiment, an agricultural intelligence computer system receives a plurality of sets of radar based precipitation rate estimate values, each set associated with a different time of a plurality of times and each set comprising a plurality of precipitation rate estimate values each of which are associated with a particular location. The agricultural intelligence computer system identifies a first precipitation rate estimate value in a first set of radar based precipitation rate estimate values that corresponds to a second precipitation rate estimate value in a second set of radar based precipitation rate estimate values. Using the two corresponding precipitation rate estimate values, the agricultural intelligence computer system computes a precipitation accumulation at a location and time between the locations and times associated with the two corresponding precipitation rate estimate values.

In an embodiment, a method comprises receiving over a network at a digital computing system a plurality of radar based precipitation rate values representing radar based precipitation rate measurements at a plurality of locations and a plurality of times; identifying a first non-zero radar based precipitation rate value associated with a first location of the plurality of locations and a first time of the plurality of times; identifying a second non-zero radar based precipitation rate value associated with a second location of the plurality of locations and a second time of the plurality of times; determining that the second non-zero radar based precipitation rate value corresponds to the first non-zero radar based precipitation rate value; computing, for a third location and a third time, a non-zero precipitation accumulation value based on the first non-zero radar based precipitation rate value and the second non-zero radar based precipitation rate value.

2. Example Agricultural Intelligence Computer System
2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGR-ESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
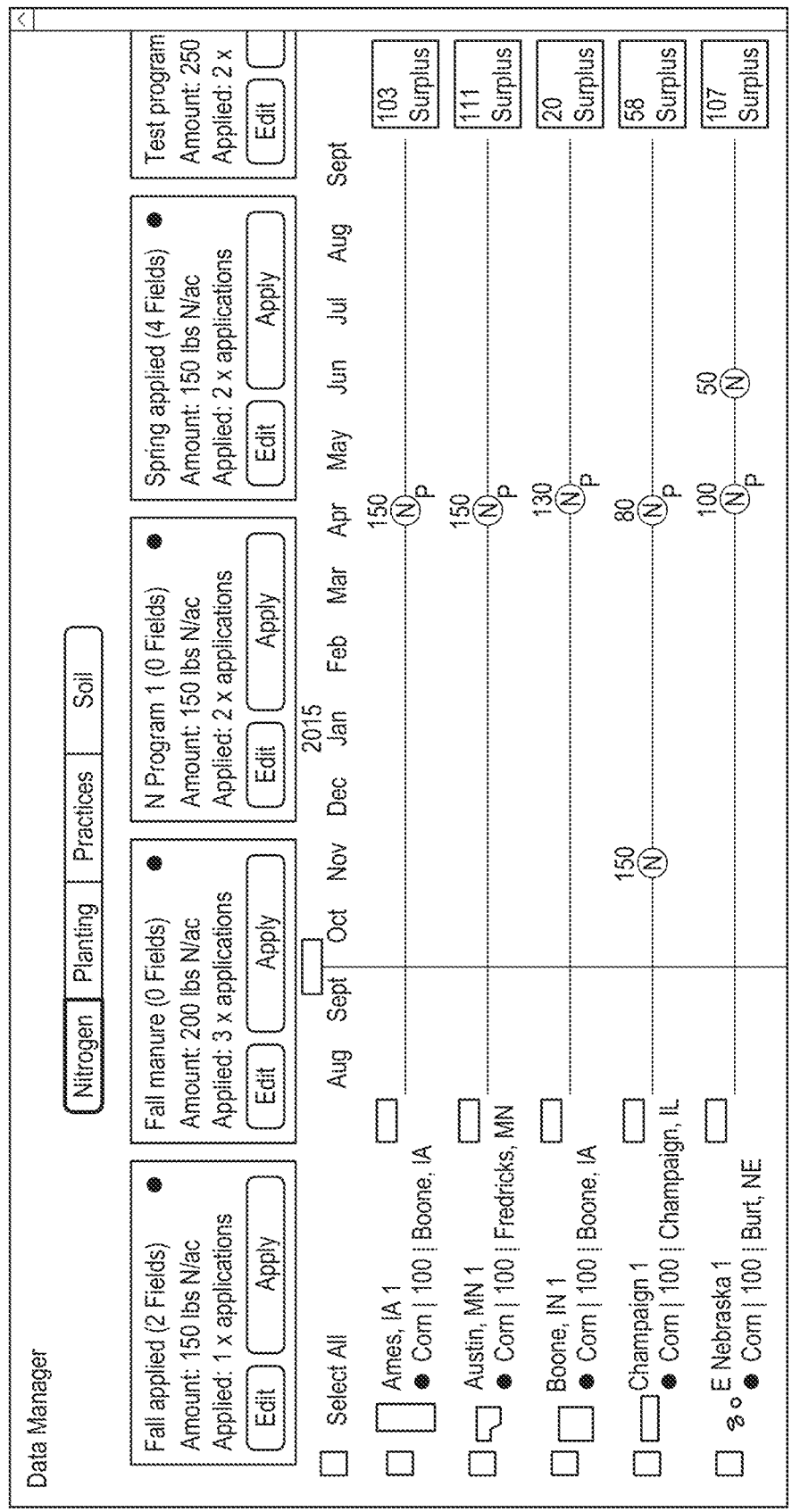
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Spatiotemporal interpolation instructions 136 comprise computer readable instructions which, when executed by one or more processors, cause agricultural intelligence computer system 130 to perform computation of precipitation accumulation for a particular location using radar based precipitation estimate values associated with a plurality of locations and a plurality of times. Cross correlation instructions 138 comprise computer readable instructions which, when executed by one or more processors, cause agricultural intelligence computer system 130 to perform identification and correlation of a plurality of radar based precipitation estimate values associated with a plurality of locations and a plurality of times.

In one embodiment, each of spatiotemporal interpolation instructions 136 and cross correlation instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the nutrient modeling instructions 135 may comprise a set of pages in RAM that contain instructions which when executed cause performing the nutrient modeling functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the spatiotemporal interpolation instructions 136 and cross correlation instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
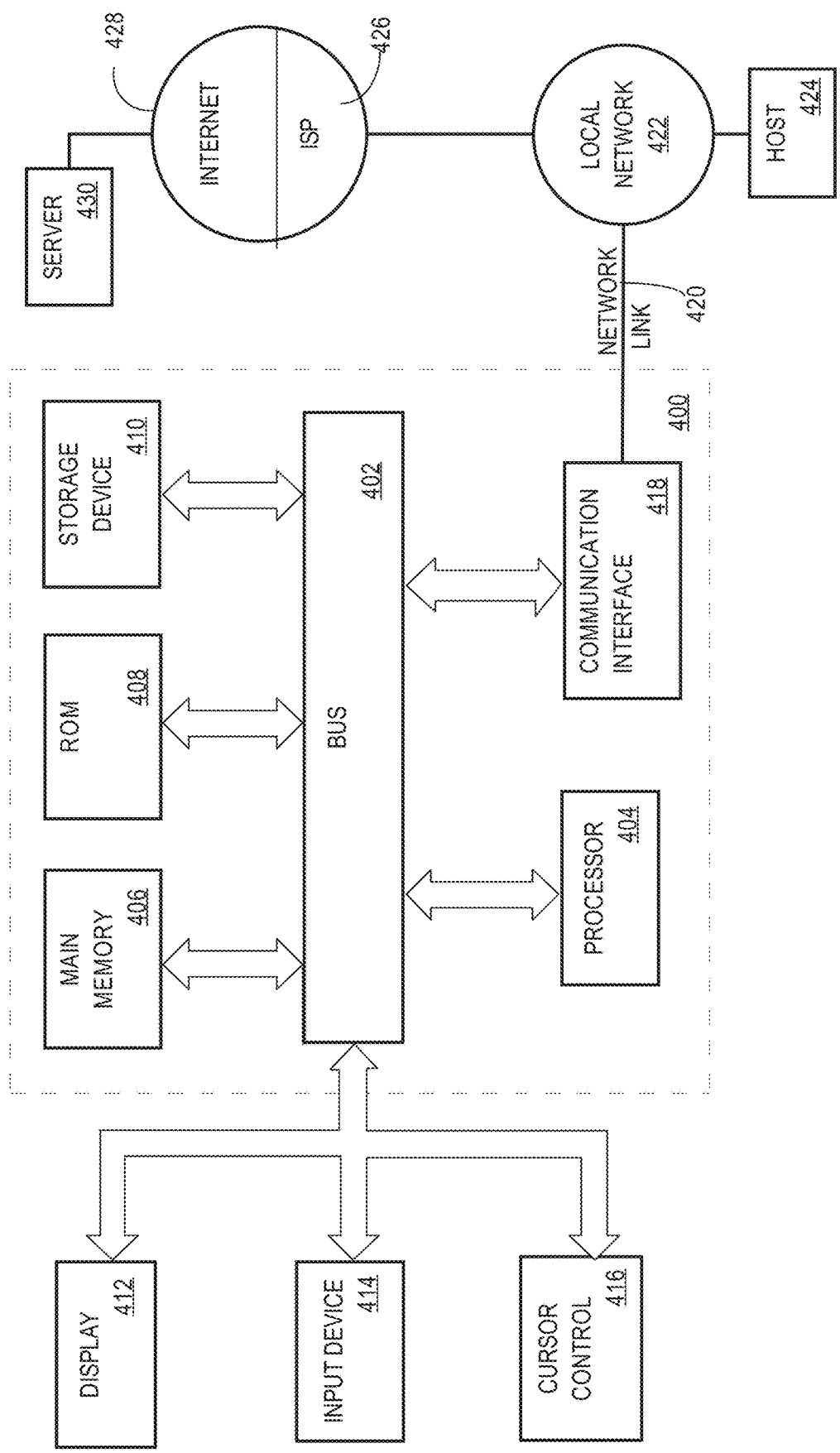
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
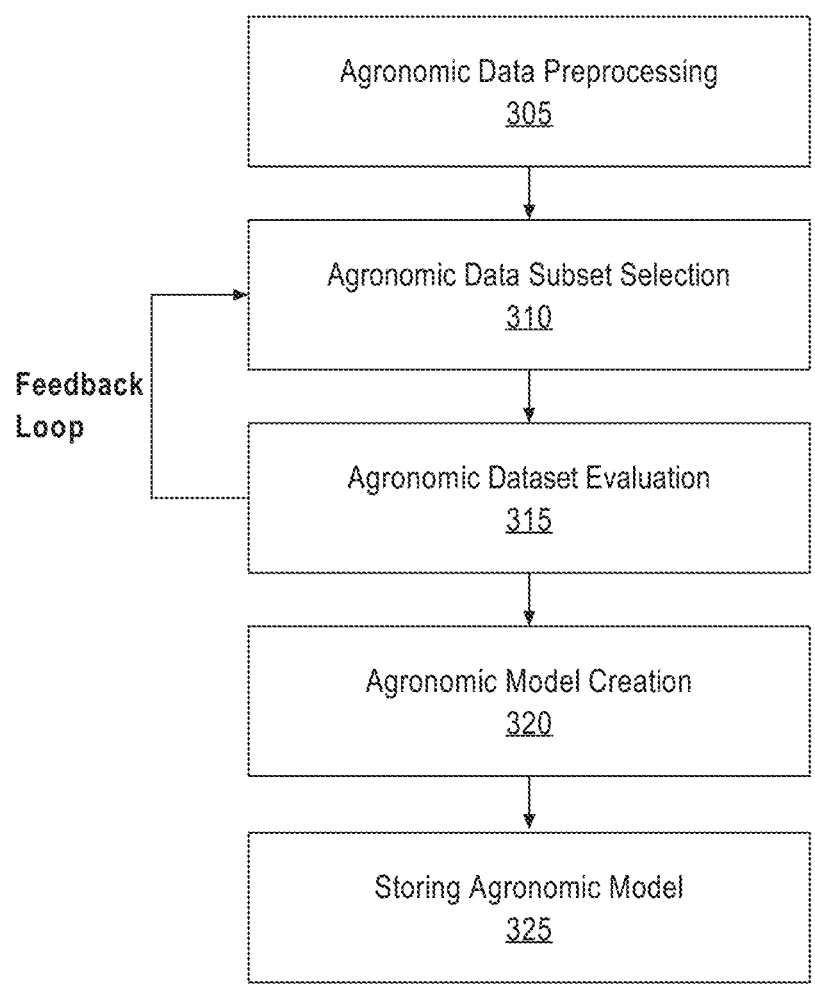
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Precipitation Interpolation

Figure 7:
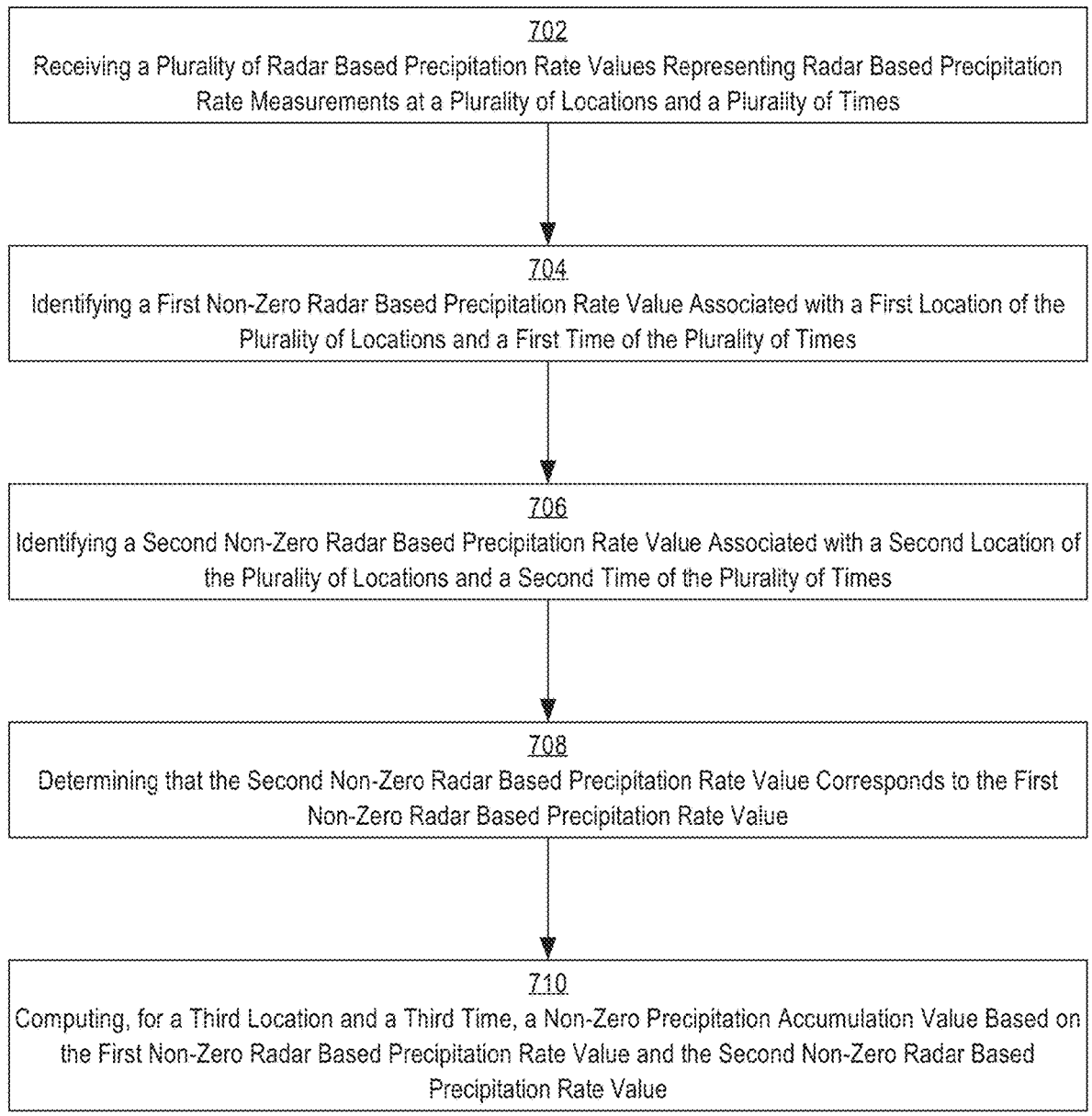
FIG. 7 is a flow diagram that depicts a method of interpolating radar based precipitation estimates across space and time.

FIG. 7 is a flow diagram that depicts a method of interpolating radar based precipitation estimates across space and time.

3.1 Radar Based Precipitation Estimates

At step 702, a plurality of radar based precipitation rate values representing radar based precipitation rate measurements at a plurality of locations and a plurality of times are received. Agricultural intelligence computer system 130 may obtain the radar based precipitation estimates by initially receiving radar precipitation estimates from external data server computer 108. Additionally and/or alternatively, agricultural intelligence computer system 130 may initially receive radar reflectivity measurements from the external data server computer 108 and compute the radar based precipitation estimates from the radar reflectivity measurements. In an embodiment, external data server computer 108 comprises a plurality of server computers owned or operated by different entities. For example, agricultural intelligence computer system 130 may be communicatively coupled to one or more radar server computers operated by a first entity and one or more radar server computers operated by a second entity.

The one or more radar server computers may be communicatively coupled to a radar device which emits a polarized signal towards the one or more gauge locations and receives scattered energy. In some embodiments, agricultural intelligence computer system 130 receives reflectivity data, comprising a location of the radar device, an amount of energy emitted from the radar device, a direction of the energy emission, an amount of time between the emission and the receipt of the scattered energy, and an amount of scattered energy received. From the reflectivity data, agricultural intelligence computer system 130 may compute the location of the precipitation and the magnitude of the precipitation.

In other embodiments, one or more initial computations may be performed in advance, such as by the one or more radar server computers, and agricultural intelligence computer system 130 may receive location and/or precipitation magnitude estimates from the one or more radar server computers. For example, agricultural intelligence computer system 130 may send a digital request or message to the one or more radar server computers to retrieve radar measurements or precipitation estimates for a plurality of locations across a particular region. The request or message may specify the locations of interest by latitude-longitude values or other identification values.

In response, the one or more radar computer servers may compute the location of precipitation for each reflectivity measurement and may identify energy measurements that are associated with the plurality of locations. The one or more radar computer servers may send the reflectivity measurements associated with the plurality of locations to agricultural intelligence computer system 130 in one or more response messages. Additionally and/or alternatively, the one or more radar computer servers may compute estimates for the amount of precipitation at the plurality of locations and send the computed estimates to agricultural intelligence computer system 130.

Agricultural intelligence computer system 130 may be programmed or configured to receive radar data from multiple different sources. Agricultural intelligence computer system 130 may use the radar data received from different sources to strengthen the computation of precipitation intensities and the determination of the errors in the precipitation intensities. For example, agricultural intelligence computer system 130 may receive radar reflectivity measurements from multiple different radar devices at different locations. Agricultural intelligence computer system 130 may use the multiple measurements to correct for errors in the radar reflectivity measurements caused by outside sources, such as noise, atmospheric conditions, or physical barriers between radar devices and gauge locations. Additionally and/or alternatively, agricultural intelligence computer system 130 may model errors for precipitation estimates for each different radar device.

In an embodiment, agricultural intelligence computer system 130 parameterizes the Z-R transformation in order to compute the radar based precipitation estimates. Parameterizing the Z-R transformation may comprise identifying values for a and b in the Z-R transformation, $Z=aR^b$ that minimizes the difference between observed gauge measurements and estimations of the precipitation intensity calculated through the Z-R transformation. Agricultural intelligence computer system 130 may create a single parameterization of the Z-R transformation or create parameterizations of the Z-R transformation for particular periods of time, particular locations, particular types of precipitation or any combination. For example, agricultural intelligence computer system 130 may parameterize the Z-R transformation for each twenty four hour period based on gauge measurements and reflectivity data received over the past twenty four hours.

Additionally and/or alternatively, agricultural intelligence computer system 130 may parameterize the Z-R transformation separately for various locations. For example, agricultural intelligence computer system 130 may select a region that has been identified as encompassing a particular weather pattern and parameterize the Z-R transformation using gauge measurements and reflectivity data from gauges in the region identified as encompassing the particular weather pattern. Agricultural intelligence computer system 130 may also use combinations of temporal and geographical constraints in parameterizing the Z-R transformation. For example, agricultural intelligence computer system 130 may identify a particular weather pattern that encompasses a particular region during a particular period of time. Agricultural intelligence computer system 130 may parameterize the Z-R transformation using gauge measurements and reflectivity data from gauges in the particular region during the particular period of time.

In an embodiment, agricultural intelligence computer system 130 receives radar reflectivity measurements and/or radar based precipitation estimates at a plurality of separate times ("snapshots") across a plurality of locations. For example, for a plurality of locations, agricultural intelligence computer system 130 may receive a first plurality of radar reflectivity measurements and/or radar based precipitation estimates corresponding to a first time and a second plurality of radar reflectivity measurements and/or radar based precipitation estimates corresponding to a second time. Thus, each plurality of precipitation measurements corresponds to a different time. The different times may be evenly spaced apart. For example, radar systems may take radar reflectivity measurements at intervals, such as four minute intervals, throughout a given day. Intervals may be regular or irregular.

In an embodiment, agricultural intelligence computer system 130 generates precipitation rate estimate maps for each time of a plurality of times. For example, agricultural intelligence computer system 130 may store each precipitation estimate with data identifying a particular time and location, such as latitude and longitude. Agricultural intelligence computer system 130 may identify each precipitation estimate associated with a first time and generate a first map of precipitation estimates for the first time. Agricultural intelligence computer system 130 may then identify each precipitation estimate associated with a second time and generate a second map of precipitation estimates for the second time. A "map," in this context, refers to digitally stored data that can be interpreted or used as the basis of generating a graphical image of a geographic area on a computer display.

3.2 Interpolating Intensity

In an embodiment, agricultural intelligence computer system 130 computes a precipitation accumulation estimate for each location of the plurality of locations. Example operations for generating such estimates are described further below and the description in this section is intended to disclose algorithms that can be implemented as executable code such as spatiotemporal interpolation instructions 136 (FIG. 1).

For each location, agricultural intelligence computer system 130 may estimate a total hourly and/or daily precipitation accumulation based on reflectivity measurements at the particular location. Agricultural intelligence computer system 130 may compute the total hourly and/or daily precipitation accumulation by computing an average precipitate rate estimate and multiplying the average precipitation rate estimate by the interval of time. Additionally and/or alternatively, for each precipitation rate estimate at a particular location, agricultural intelligence computer system 130 may compute a precipitation accumulation as a product of the precipitation rate and an estimate of an amount of time for which the precipitation rate estimate is valid. For example, if radar reflectivity measurements are taken every four minutes, then a precipitation rate estimate based on a particular radar reflectivity measurement may be valid for four minutes before the next radar reflectivity measurement is taken. The computed precipitation accumulations may be summed for a particular hour and/or day in order to generate hourly and/or daily precipitation accumulation estimates.

In an embodiment, agricultural intelligence computer system 130 interpolates radar based precipitation rate estimates at a particular location to points in time where precipitation estimates are not available. Thus, if radar reflectivity measurements are taken every four minutes, then precipitation rates may be interpolated to the times between each measurement. For example, agricultural intelligence computer system 130 may use the following equation to compute hourly precipitation accumulation based on interpolated precipitation rate estimates:

$$H = (1 - t_{N-1}) \frac{r(t_n) + r(t_{N-1})}{2} + \sum_{i=1}^{N-1} (t_i - t_{i-1}) \frac{r(t_i) + r(t_{i-1})}{2} + (t_0) \frac{r(t_1) + r(t_0)}{2}$$

where $r(t_0)$ and $r(t_N)$ are precipitation rate estimates from just before and after the hourly interval respectively and $t_0$ is a negative value. As a second example, agricultural intelligence computer system 130 may use the following equation to compute hourly precipitation accumulation based on interpolated precipitation rate estimates:

$$H = r(t_0) \frac{t_1 - t_0}{2} + r(t_N) \frac{1 - t_{N-1}}{2} + \sum_{i=1}^{N-1} r(t_i) \frac{t_{i+1} - t_{i-1}}{2}$$

where $r(t_0)$ and $r(t_N)$ are precipitation rate estimates from just before and after the hourly interval respectively.

3.3 Interpolating Across Space and Time

In an embodiment, agricultural intelligence computer system 130 performs spatiotemporal interpolation of precipitation rate estimates in order to account for fast moving storms and to further increase the accuracy of precipitation rate estimates generally. While the interpolation across time allows agricultural intelligence computer system 130 to compute precipitation accumulation for a single location, the temporal interpolation does not take into account the movement of a precipitation event. For example, small convective storms may pass over a particular location in between radar reflectivity measurements, such that a precipitation rate estimate is not computed for the particular location. Additionally, discrete cells of a storm may pass over particular locations, increasing the intensity of the precipitation rate briefly in between radar reflectivity measurements. Example operations are described further below and the description in this section is intended to disclose algorithms that can be implemented as executable code such as cross correlation instructions 138 (FIG. 1).

Referring again to FIG. 7, at step 704, a first non-zero radar based precipitation rate value associated with a first location of the plurality of locations and a first time of the plurality of times is identified. For example, a first plurality of radar based precipitation estimate values based on a plurality of radar reflectivity measurements taken at the first time may include a first precipitation rate estimate value associated with a first location. Agricultural intelligence computer system 130 may be configured to identify locations with non-zero precipitation estimates as current locations of precipitation at a snapshot time associated with the radar reflectivity measurements.

At step 706, a second non-zero radar based precipitation rate value associated with a second location of the plurality of locations and a second time of the plurality of times is identified. For example, a second plurality of radar based precipitation estimate values based on a plurality of radar reflectivity measurements taken at the second time may include a second precipitation estimate value associated with a second location. In an embodiment, the first time and the second time are separated by a gap of time in which there are no precipitation estimates.

At step 708, the second non-zero radar based precipitation rate value is determined to correspond to the first non-zero radar based precipitation rate value. For example, agricultural intelligence computer system 130 may determine that two precipitation rate values at different locations and times correspond to the same precipitation event. Agricultural intelligence computer system 130 may determine that the two precipitation rate values correspond to each other by tracking the movement of a precipitation event, performing Fourier Transforms on two pluralities of pixels, and/or performing cell tracking methods described further herein.

At step 710, a non-zero precipitation accumulation based on the first non-zero radar based precipitation rate value and the second non-zero radar based precipitation rate value is computed for a third location and a third time. For example, agricultural intelligence computer system 130 may interpolate precipitation rate estimates to the third location for a particular time interval and compute the total accumulation for the third location based on the interpolated precipitation rate estimate.

FIG. 8 depicts an example of interpolating precipitation rate estimates to a third location and time based on precipitation rate estimates at a first and second location and time. In FIG. 8, Time T1 and Time T3 represent successive snapshots of precipitation rate estimates for a plurality of locations based on radar reflectivity measurements taken in succession. Time T2 represents a time between Time T1 and Time T3 which has no corresponding radar reflectivity measurements. At Time T1, location 802 contains a non-zero radar based precipitation rate estimate while location 804 and location 806 contain a zero radar based precipitation rate estimate. At Time T3, location 806 contains a non-zero radar based precipitation rate estimate and location 804 still contains a zero radar based precipitation rate estimate. Agricultural intelligence computer system 130 uses the non-zero radar based precipitation rate estimate at location 802 and time T1 and the non-zero radar based precipitation rate estimate at location 806 and time T3 to compute a non-zero radar based precipitation rate estimate and/or precipitation accumulation estimate at location 804 and Time T2.

In an embodiment, agricultural intelligence computer system 130 computes the accumulation at the third location as a function of the rate of movement of a precipitation event. For example, a computation of the total accumulation for a particular hour of time may be computed as follows:

$$H(x, y) = \frac{1}{M} \sum_{i=0}^{M} R_i(x, y)$$

where x and y are the coordinates for the third location, M is the number of samples of radar reflectivity data, and $R_i(x, y)$ is the estimated hourly accumulation at each point in time, computed as:

$$R_i(x, y) = (1 - \alpha_i) r(t_{k-1}, x + \alpha_i u, y + \alpha_i v) + \alpha_i r(t_k, x - (1 - \alpha_i) u, y - (1 - \alpha_i) v)$$

where:

$$\alpha_i = \frac{\frac{i}{M} - t_{k-1}}{t_k - t_{k-1}}$$

where u, v is the rate of movement of one or more precipitation events and $\alpha_t \in [0,1]$. The above equations identify a rate of precipitation for each location and time based on precipitation estimates in nearby locations and rate of movement estimates of precipitation events.

In an embodiment, agricultural intelligence computer system 130 estimates the rate of movement of a precipitation event based on prior precipitation rate estimate values. For example, if agricultural intelligence computer system 130 has received a plurality of measurements of a particular precipitation event, agricultural intelligence computer system 130 may estimate a speed and direction of the precipitation event. Based on the speed and direction of the precipitation event and the first non-zero radar based precipitation rate value at the first time, agricultural intelligence computer system 130 may estimate an area that likely contains the precipitation event at the second time. Agricultural intelligence computer system 130 may determine that the first non-zero radar based precipitation value corresponds to the second non-zero precipitation rate value if the second non-zero precipitation rate value is in the estimated area.

3.3.1 Phase Correlation

In an embodiment, agricultural intelligence computer system 130 estimates the rate of movement of precipitation events using phase correlation. For example, agricultural intelligence computer system 130 may generate a first mapping of a first set of precipitation rate value estimates for a plurality of locations at a first time and a second mapping of a second set of precipitation rate value estimates for the plurality of locations at a second time. Agricultural intelligence computer system 130 may compute a Fourier Transform of the second mapping of the second set of precipitation rate values so that the first mapping and the second mapping are shifted in phase from each other. Agricultural intelligence computer system 130 may then compute the shift in phase in order to identify corresponding locations and compute the rate of movement of the precipitation events.

In an embodiment, the phase correlation of the Fourier Transform of the second mapping assumes uniform movement of precipitation events in the two mappings. Thus, if two storms in a first mapping move at different speeds or in different directions, the phase correlation of the Fourier Transform may not accurately compute the rate of movement of the different storms. In an embodiment, agricultural intelligence computer system 130 may perform phase correlation using a relatively small subset of locations in order to avoid interference caused by other storms moving at different speeds or in different directions. For example, agricultural intelligence computer system may store a threshold value identifying the furthest distance a storm is likely to travel within the period of time between the time associated with the first plurality of radar based precipitation rate values and the time associated with the second plurality of radar based precipitation rate values. For each non-zero radar based precipitation rate estimate value and/or grouping of non-zero radar based precipitation rate estimate values in the first plurality of precipitation rate estimate values, agricultural intelligence computing system 130 may generate the first and second mapping comprising all precipitation rate estimate values within a threshold distance of the non-zero radar based precipitation estimate value. Agricultural intelligence computer system 130 may then perform the phase correlation techniques described herein for the two mappings.

In an embodiment, agricultural intelligence computer system 130 identifies non-zero radar based precipitation rate estimate values within a mapping to be removed for phase correlation. For example, if a mapping includes non-zero precipitation rate estimate values from two different storms and/or from supercells of a single storm, agricultural intelligence computer system 130 may remove the excess non-zero precipitation rate estimates from the first mapping in order to perform the phase correlation techniques described herein. Different storms and/or discrete cells within a line of storms may be identified by the rate of movement of precipitation events computed from prior mappings and/or from differences in intensity values in precipitation rate estimates of the first mapping. Additionally, in the second mapping, agricultural intelligence computer system 130 may remove the precipitation rate estimate values that correspond to those removed in the first mapping. For example, if both the first and second mapping include both a low precipitation rate estimate value and a high precipitation rate estimate value, agricultural intelligence computer system 130 may remove the high values from both mappings and perform the phase correlation with the low values in order to track movement of the lower intensity storm. Agricultural intelligence computer system 130 may then remove the low values from both mappings and perform the phase correlation with the high values in order to track movement of the higher intensity storm.

3.3.2 Cell Tracking

In an embodiment, agricultural intelligence computer system 130 estimates the rate of movement of precipitation events using cell tracking. Cell tracking is a method of spatiotemporal interpolation which identifies cells containing precipitation estimates and interpolates precipitation values between the cells. As used herein, a cell comprises one or more precipitation estimate values within a particular location which, when combined, identify a single precipitation event. In an embodiment, agricultural intelligence computer system 130 identifies, for each time of the plurality of times, each radar based precipitation estimate value of the plurality of radar based precipitation estimate values that contains a non-zero estimate. In an embodiment, agricultural intelligence computer system 130 also disregards radar based precipitation estimate values with nominal levels of precipitation. For example, agricultural intelligence computer system 130 may store a nominal threshold value indicating a nominal precipitation estimate value, such as 2.5 mm/hr. Agricultural intelligence computer system 130 may identify each radar based precipitation estimate value that contains a precipitation rate above the stored nominal threshold value. By disregarding nominal levels of precipitation, agricultural intelligence computer system 130 is able to speed up the computation of radar-based precipitation estimates, thereby making the method scalable to a larger spatial domain.

Agricultural intelligence computer system 130 may then identify cells in the second plurality of radar based precipitation estimate values that comprise non-zero values and/or values above the stored nominal threshold value. Agricultural intelligence computer system 130 may cross correlate the identified cells in the first plurality of radar based precipitation estimate values with the cells from the second plurality of radar based precipitation estimate values. Cross correlating cells may comprise identifying cells in the second plurality of radar based precipitation rate estimates that are within a threshold distance from the cells in the first plurality of radar based precipitation rate estimates. For example, agricultural intelligence computer system may store a threshold value identifying the furthest distance a storm is likely to travel within the period of time between the time associated with the first plurality of radar based precipitation rate values and the time associated with the second plurality of radar based precipitation rate values. For each identified cell in the first plurality of precipitation rate estimate values, agricultural intelligence computing system 130 may identify a cell in the second plurality of precipitation rate estimate values within a threshold distance of the non-zero radar based precipitation estimate value. Agricultural intelligence computer system 130 may then compute the rate of movement of the precipitation event associated with the cell based on the distance between the cell in the first plurality of precipitation rate estimate values and the cell in the second plurality of precipitation rate estimate values.

In an embodiment, agricultural intelligence computer system 130 distinguishes between cells in the second plurality of precipitation rate estimate values that are within a threshold distance of a cell in the first plurality of precipitation rate estimate values. For example, in the case of multiple storms in the same area or moving discrete cells of a storm, a cell in the first plurality of precipitation estimate values may cross correlate to a plurality of cells in the second plurality of precipitation estimate values which are within the threshold distance of the first cell. Agricultural intelligence computer system 130 may identify a cell out of the plurality of cells in the second plurality of precipitation estimate values within the threshold distance from the first cell based on a prior estimated rate of movement of the first cell and/or the differences between the intensity of the first cell and the plurality of second cells.

In an embodiment, agricultural intelligence computer system 130 identifies a prior rate of movement and/or a future rate of movement for a precipitation event in order to distinguish between cells in the second plurality of precipitation rate estimates. As an example, the plurality of times may include fifteen different times associated with radar reflectivity measurements in a particular hour. If agricultural intelligence computer system 130 identifies two cells in the plurality of radar based precipitation rate estimates at the sixth time which are within the threshold distance of a particular cell in the plurality of radar based precipitation rate estimates at the fifth time, agricultural intelligence computer system 130 may compute a rate of movement of the precipitation event associated with the particular cell based on correlations of cells at the first five times. Using the estimated rate of movement of the precipitation event, agricultural intelligence computer system 130 may identify a likely location of the particular cell at the sixth time. Agricultural intelligence computer system 130 may then select a cell at the sixth time which is closest to the identified location to correlate to the particular cell at the fifth time. Additionally and/or alternatively, agricultural intelligence computer system 130 may estimate the rate of movement of the precipitation event at the last ten times for each of the cells at the sixth time in order to identify likely locations of the same cells at the fifth time. Agricultural intelligence computer system 130 may then select a cell at the sixth time which has a likely location at the fifth time which is closest to the particular cell at the fifth time.

In an embodiment, agricultural intelligence computer system 130 uses differences in intensity in order to distinguish between cells in the second plurality of precipitation rate estimates. For example, agricultural intelligence computer system 130 may select a cell in the second plurality of precipitation rate estimates with a precipitation rate estimate value closest to the precipitation rate estimate value of the cell in the first plurality of precipitation rate estimates. As an example, a first cell at a first time comprises a precipitation rate estimate value of 5.1 mm/hr. Two cells at a second time are within the threshold distance of the first cell. The first of the two comprises a precipitation rate estimate value of 10.3 mm/hr while the second of the two comprises a precipitation rate estimate value of 4.8 mm/hr. Agricultural intelligence computer system 130 may select the second of the two cells to cross correlate to the first cell based on the lower difference in intensity between the first cell and the second of the two cells than between the first cell and the first of the two cells.

By estimating the rate of movement of precipitation events using cell tracking, agricultural intelligence computer system 130 saves on processing power from methods such as phase correlation through Fourier Transforms discussed above. While Fourier Transforms require transformation of an entire image of precipitation rate estimate values, cell tracking allows agricultural intelligence computer system 130 to ignore pixels that contain no precipitation rate estimate values when computing the rate of movement of precipitation events. Thus, instead of performing transformations on every single pixel, agricultural intelligence computer system 130 identifies the rate of movement of precipitation events using only the non-zero precipitation rate estimate values.

In an embodiment, agricultural intelligence computer system 130 additionally interpolates precipitation intensity to locations for times at which no radar reflectivity measurements are available. For example, if a cell at a first time and location contains a precipitation estimate of 5 mm/hr and the cell at a second time and location contains a precipitation estimate of 10 mm/hr, agricultural intelligence computer system 130 may compute a change in intensity of the precipitation associated with the cell as it moves from the first location at the first time to the second location at the second time. Thus, at a time and location directly in between the two estimates of precipitation for the cell, agricultural intelligence computer system 130 may estimate the precipitation at 7.5 mm/hr.

4. Precipitation Data

In an embodiment, agricultural intelligence computer system 130 displays precipitation estimates on a client computing device. For example, field manager computing device 104 may send a request to agricultural intelligence computer system 130 for precipitation data at a particular location. Agricultural intelligence computer system 130 may send back data indicating whether it rained at the particular location and indicating a particular precipitation accumulation for a particular period of time, such as an hour or day. Agricultural intelligence computer system 130 may also classify a particular location as wet or dry based on estimated precipitation at the location. For example, if a location receives precipitation above 0.25 mm, agricultural intelligence computer system 130 may classify the field as wet. If the location receives precipitation under 0.25 mm, agricultural intelligence computer system 130 may classify the field as dry.

In an embodiment, agricultural intelligence computer system 130 also generates and displays data indicating whether a field is workable based on precipitation accumulation. For example, agricultural intelligence computer system 130 may store a daily accumulation threshold. If the daily accumulation of precipitation for a particular field is above the daily accumulation threshold, agricultural intelligence computer system 130 may classify the field as unworkable. If the daily accumulation of precipitation for the particular field is below the daily accumulation threshold, agricultural intelligence computer system 130 may classify the field as workable.

5. Agronomic Models

In an embodiment, agricultural intelligence computer system 130 uses precipitation estimates to create an agronomic model. In an embodiment, an agronomic model is a data structure in memory of agricultural intelligence computer system 130 that contains location and crop information for one or more fields. An agronomic model may also contain agronomic factors which describe conditions which may affect the growth of one or more crops on a field. Additionally, an agronomic model may contain recommendations based on agronomic factors such as crop recommendations, watering recommendations, planting recommendations, and harvesting recommendations. The agronomic factors may also be used to estimate one or more crop related results, such as agronomic yield. The agronomic yield of a crop is an estimate of quantity of the crop that is produced. The model also may include stored digital representations of expressions or relationships between these data elements.

In an embodiment, agricultural intelligence computer system 130 uses the precipitation estimates to create an agronomic model in memory or in persistent storage in response to a request from field manager computing device 104 for an agronomic model. In other embodiments, agricultural intelligence computer system 130 receives a request from a third party for an agronomic model. For example, an insurance company may request an agronomic model for an insured customer's field to determine the risks associated with the crop planted by the customer. In another example, an application server may send a request to agricultural intelligence computer system 130 to create an agronomic model for a specific user's field. Alternatively, agricultural intelligence computer system 130 may generate agronomic models periodically for particular supervised fields. Agricultural intelligence computer system 130 may also generate agronomic models in response to obtaining updated precipitation estimates.

Agricultural intelligence computer system 130 may create an agronomic model which identifies one or more effects of received precipitation on the crops of a field. The amount of water a crop receives may affect the development cycle of the crop. Agricultural intelligence computer system 130 may estimate the amount of water a crop needs and determine the likely amount of water the crop will receive from natural precipitation based on the precipitation estimates. Agricultural intelligence computer system 130 may use this information to affect the estimate for agronomic yield. Additionally, agricultural intelligence computer system 130 may use the precipitation estimates to generate recommendations for farmers. For example, agricultural intelligence computer system 130 may recommend that a crop is not watered on a day that has a high probability of large amounts of precipitation. Alternatively, agricultural intelligence computer system 130 may recommend that a crop receives extra water for periods of time when precipitation has been estimated to be low.

6. Benefits of Certain Embodiments

Using the techniques described herein, a computer can improve upon radar based precipitation estimates by computing precipitation estimate values in between times for which radar reflectivity data exists. For example, the techniques herein can enable computers to determine, for a particular location, a precipitation accumulation when radar devices are not fast enough to capture radar reflectivity measurements at the particular location. The performance of the agricultural intelligence computing system is improved using the cell tracking techniques described herein which save on computing power by computing precipitation estimates without requiring transformations to be performed on radar based precipitation estimate values at every location. Additionally, the techniques described herein may be used to create recommendations and alerts for farmers, insurance companies, and hydrologists, thereby allowing for a more effective response to particular weather conditions in the operation of agricultural equipment, application of chemicals to fields, protection of crops and other tangible steps in the field.

7. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computing system comprising:
   a memory;
   one or more processors, communicatively coupled to the memory, and configured to execute instructions which, when executed by the one or more processors, cause the computing system to:
   receive over a network at the computing system a plurality of precipitation rate values representing precipitation rate measurements at a plurality of locations and a plurality of times;
   identify a first non-zero precipitation rate value associated with a first location of the plurality of locations and a first time of the plurality of times;
   identify a second non-zero precipitation rate value associated with a second location of the plurality of locations and a second time of the plurality of times;
   determine that the second non-zero precipitation rate value corresponds to the first non-zero precipitation rate value;
   compute, for a third location and a third time, a non-zero precipitation accumulation value based on the first non-zero precipitation rate value and the second non-zero precipitation rate value.

2. The computing system of claim 1, wherein the plurality of precipitation rate values includes a first zero value of precipitation that was recorded for the third location at the first time and a second zero value of precipitation that was recorded for the third location at the second time; wherein the plurality of times does not include a time between the first time and the second time.

3. The computing system of claim 1, wherein the instructions, when executed by the one or more processors, further cause the computing system to:
   generate a first map of precipitation rate values for precipitation that was recorded at the first time;
   generate a second map of precipitation rate values for precipitation that was recorded at the second time;
   determine that the second non-zero precipitation rate value corresponds to the first non-zero precipitation rate value based on the first map of precipitation rate values at the first time and the second map of precipitation rate values at the second time.

4. The computing system of claim 3, wherein the instructions, when executed by the one or more processors, further cause the computing system to:
  store, in the digital computing system, a first threshold value;
  determine, in the first map of precipitation rate values for precipitation that was recorded at the first time and the second map of precipitation rate values for precipitation that was recorded at the second time, that both the first non-zero precipitation rate value and the second non-zero precipitation rate value are above the first threshold value;
  determine that the second non-zero precipitation rate value corresponds to the first non-zero precipitation rate value based, at least in part, on the determination that both the first non-zero precipitation rate value and the second non-zero precipitation rate value are above the first threshold value.

5. The computing system of claim 4, wherein the instructions, when executed by the one or more processors, further cause the computing system to:
  store, in the digital computing system, a second threshold value;
  determine, in the first map of precipitation rate values for precipitation that was recorded at the first time and the second map of precipitation rate values for precipitation that was recorded at the second time, that a distance between the first non-zero precipitation rate value and the second non-zero precipitation rate value is less than the second threshold value;
  determine that the second non-zero precipitation rate value corresponds to the first non-zero precipitation rate value based, at least in part, on the determination that the distance between the first non-zero precipitation rate value and the second non-zero precipitation rate value is less than the second threshold value.

6. The computing system of claim 5, wherein the instructions, when executed by the one or more processors, further cause the computing system to:
  store, in the digital computing system, a third threshold value;
  determine, in the first map of precipitation rate values for precipitation that was recorded at the first time and the second map of precipitation rate values for precipitation that was recorded at the second time, that a difference between the first non-zero precipitation rate value and the second non-zero precipitation rate value is less than the third threshold value;
  determine that the second non-zero precipitation rate value corresponds to the first non-zero precipitation rate value based, at least in part, on the determination that the difference between the first non-zero precipitation rate value and the second non-zero precipitation rate value is less than the third threshold value.

7. The computing system of claim 1, wherein the instructions, when executed by the one or more processors, further cause the computing system to:
  compute, based on the first non-zero precipitation rate value and the second non-zero precipitation value, a rate of physical movement in air or over land of a particular precipitation event;
  identify a third non-zero precipitation rate value associated with a fourth location of the plurality of locations and a fourth time of the plurality of times;
  determine that the third non-zero precipitation rate value corresponds to the second non-zero precipitation rate value and the first non-zero precipitation rate value based, at least in part, on the rate of physical movement of the particular precipitation event.

8. The computing system of claim 1, wherein the instructions, when executed by the one or more processors, further cause the computing system to:
  store, in the digital computing system, a first threshold value;
  determine that the non-zero precipitation accumulation value is above the first threshold value and, in response, sending to a client computing device, digital data indicating that precipitation occurred at the third location.

9. The computing system of claim 1, wherein the instructions, when executed by the one or more processors, further cause the computing system to:
  store, in the digital computing system, a first threshold value;
  determine that the non-zero precipitation accumulation value is above the first threshold value and, in response to determining, sending to a client computing device, digital data indicating that a field at the third location is unworkable for agricultural purposes.

10. The computing system of claim 1, wherein the instructions, when executed by the one or more processors, further cause the computing system to:
  compute, based on the first non-zero precipitation rate value and the second non-zero precipitation rate value, a rate of change of precipitation intensity of a particular precipitation event corresponding to the first non-zero precipitation rate value and the second non-zero precipitation rate value;
  compute the non-zero precipitation accumulation value based, at least in part, on the rate of change of precipitation intensity of the particular precipitation event.

11. The system of claim 1, wherein the precipitation rate values comprise rain gauge values, radar-based precipitation estimates, or weather forecasts.

12. A method comprising:
  receiving over a network at a digital computing system a plurality of precipitation rate values representing precipitation rate measurements at a plurality of locations and a plurality of times;
  identifying a first non-zero precipitation rate value associated with a first location of the plurality of locations and a first time of the plurality of times;
  identifying a second non-zero precipitation rate value associated with a second location of the plurality of locations and a second time of the plurality of times;
  determining that the second non-zero precipitation rate value corresponds to the first non-zero precipitation rate value;
  computing, for a third location and a third time, a non-zero precipitation accumulation value based on the first non-zero precipitation rate value and the second non-zero precipitation rate value.

13. The method of claim 12, wherein the plurality of precipitation rate values includes a first zero value of precipitation that was recorded for the third location at the first time and a second zero value of precipitation that was recorded for the third location at the second time; wherein the plurality of times does not include a time between the first time and the second time.

14. The method of claim 12, further comprising:
  generating a first map of precipitation rate values for precipitation that was recorded at the first time;
  generating a second map of precipitation rate values for precipitation that was recorded at the second time;

determining that the second non-zero precipitation rate value corresponds to the first non-zero precipitation rate value based on the first map of precipitation rate values at the first time and the second map of precipitation rate values at the second time.

15. The method of claim 14, further comprising:
storing, in the digital computing system, a first threshold value;
determining, in the first map of precipitation rate values for precipitation that was recorded at the first time and the second map of precipitation rate values for precipitation that was recorded at the second time, that both the first non-zero precipitation rate value and the second non-zero precipitation rate value are above the first threshold value;
determining that the second non-zero precipitation rate value corresponds to the first non-zero precipitation rate value based, at least in part, on the determination that both the first non-zero precipitation rate value and the second non-zero precipitation rate value are above the first threshold value.

16. The method of claim 15, further comprising:
storing, in the digital computing system, a second threshold value;
determining, in the first map of precipitation rate values for precipitation that was recorded at the first time and the second map of precipitation rate values for precipitation that was recorded at the second time, that a distance between the first non-zero precipitation rate value and the second non-zero precipitation rate value is less than the second threshold value;
determining that the second non-zero precipitation rate value corresponds to the first non-zero precipitation rate value based, at least in part, on the determination that the distance between the first non-zero precipitation rate value and the second non-zero precipitation rate value is less than the second threshold value.

17. The method of claim 16, further comprising:
storing, in the digital computing system, a third threshold value;
determining, in the first map of precipitation rate values for precipitation that was recorded at the first time and the second map of precipitation rate values for precipitation that was recorded at the second time, that a difference between the first non-zero precipitation rate value and the second non-zero precipitation rate value is less than the third threshold value;
determining that the second non-zero precipitation rate value corresponds to the first non-zero precipitation rate value based, at least in part, on the determination that the difference between the first non-zero precipitation rate value and the second non-zero precipitation rate value is less than the third threshold value.

18. The method of claim 12, further comprising:
computing, based on the first non-zero precipitation rate value and the second non-zero precipitation value, a rate of physical movement in air or over land of a particular precipitation event;
identifying a third non-zero precipitation rate value associated with a fourth location of the plurality of locations and a fourth time of the plurality of times;
determining that the third non-zero precipitation rate value corresponds to the second non-zero precipitation rate value and the first non-zero precipitation rate value based, at least in part, on the rate of physical movement of the particular precipitation event.

19. The method of claim 12, further comprising:
storing, in the digital computing system, a first threshold value;
determining that the non-zero precipitation accumulation value is above the first threshold value and, in response, sending to a client computing device, digital data indicating that precipitation occurred at the third location.

20. The method of claim 12, further comprising:
storing, in the digital computing system, a first threshold value;
determining that the non-zero precipitation accumulation value is above the first threshold value and, in response to determining, sending to a client computing device, digital data indicating that a field at the third location is unworkable for agricultural purposes.

21. The method of claim 12, further comprising:
computing, based on the first non-zero precipitation rate value and the second non-zero precipitation rate value, a rate of change of precipitation intensity of a particular precipitation event corresponding to the first non-zero precipitation rate value and the second non-zero precipitation rate value;
computing the non-zero precipitation accumulation value based, at least in part, on the rate of change of precipitation intensity of the particular precipitation event.

22. The method of claim 12, wherein the precipitation rate values comprise rain gauge values, radar-based precipitation estimates, or weather forecasts.

* * * * *